United States Patent [19]
Komatsuda

[11] Patent Number: 5,239,286
[45] Date of Patent: Aug. 24, 1993

[54] BATTERY ALARM SYSTEM

[75] Inventor: Seiji Komatsuda, Sendai, Japan

[73] Assignee: Fujitsu Limited, Kawasaki, Japan

[21] Appl. No.: 752,880

[22] Filed: Aug. 30, 1991

[30] Foreign Application Priority Data

Aug. 31, 1990 [JP] Japan .................................. 2-231191

[51] Int. Cl.⁵ .............................................. G08B 21/00
[52] U.S. Cl. ..................................... 340/636; 324/426; 324/433; 320/48
[58] Field of Search ................. 340/636; 324/433, 435, 324/426; 320/48

[56] References Cited

U.S. PATENT DOCUMENTS

| | | | |
|---|---|---|---|
| 4,339,632 | 7/1982 | Early et al. | 340/636 |
| 4,633,418 | 12/1986 | Bishop | 340/636 |
| 4,820,966 | 4/1989 | Fridman | 340/636 |
| 4,839,597 | 6/1989 | Rowland | 324/426 |
| 4,929,931 | 5/1990 | McCuen | 340/636 |
| 5,027,294 | 6/1991 | Fakruddin et al. | 340/636 |
| 5,032,825 | 7/1991 | Kuznicki | 320/48 |
| 5,047,961 | 9/1991 | Simonsen | 320/48 |

*Primary Examiner*—Jin F. Ng
*Assistant Examiner*—Edward Lefkowitz

[57] ABSTRACT

A battery alarm system for generating an alarm on recognition of the reduction of an output voltage of a battery, wherein an analog output voltage value of a battery is converted to a digital value. The digitalized values are inputted into a controller for a plurality of times at predetermined intervals to obtain the average value, and when the average value is smaller than the predetermined threshold stored in the memory, an alarm is generated. By obtaining an average value of voltage values inputted for a plurality of times, an alarm can be produced stably with little influence of fluctuations of the output voltage of the battery.

4 Claims, 4 Drawing Sheets

BATTERY ALARM SYSTEM

BACKGROUND OF THE INVENTION

The present invention relates to a battery alarm system for monitoring output voltage of a battery used for a portable telephone, etc., and producing an alarm on recognizing the reduction in the output voltage.

A portable telephone requires an alarm system for producing an alarm (sound or indicator) to notify the user of the reduction in the output voltage of a battery which causes an inoperative condition of the portable telephone. In response to the alarm, the user determines whether he will stop using the portable telephone or take an appropriate action such as charging the battery. A precise and stable alarm should be produced to make a correct determination.

FIG. 1 shows a configuration of a conventional battery alarm system.

In FIG. 1, a voltage detector IC 32 and a system power source 35 are connected to the output terminal of a battery 31. The output of the voltage detector IC 32 is applied to a CPU 33. The CPU 33 and a program storage 34 are provided with electric power by the system power source 35, and the CPU 33 performs a predetermined process stored in the program storage 34.

In the above described configuration, the voltage detector IC 32 detects an output voltage of the battery 31, compares the obtained value with a predetermined threshold Vth, and notifies the CPU 33 of the result. The CPU 33 determines the alarm state when it recognizes that the output voltage of the battery 31 is lower than the threshold Vth. Then, it causes an alarm to be sounded with a buzzer 36 and a blinking alarm, etc. to be made on a display device.

In a conventional battery alarm system, however, the generation of an alarm greatly depends on the capability of a voltage detector IC 32. That is, the detector notifies a CPU 33 of information of "the alarm state" and "the normal state" changeably within a short time when the output voltage of the battery 31 is unstable and fluctuating, thus generating an alarm unstably.

Besides, in a conventional system, a threshold Vth of the voltage detector IC 32 is fixed to a determined value. Therefore, when an alarm generating value of the voltage must be modified, another voltage detector IC having another threshold should replace the first detector, thus the system becomes inoperative during an emergency modification.

SUMMARY OF THE INVENTION

An object of the present invention is to provide a battery alarm system for determining the alarm state correctly even when the output voltage of a battery is unstable, and for easily modifying the alarm producing value of the voltage.

A feature of the present invention resides in a battery alarm system for producing an alarm from an alarm generating means on recognizing the reduction in an output voltage of a battery, comprising an analog/digital converting means for converting an analog output voltage value of said battery to a digital value, a storing means for storing a threshold indicative of the output voltage which is low enough for producing an alarm, and a control means for obtaining an average value of the digital output voltage values after said values have been inputted for a plurality of times at predetermined intervals, comparing said average value with said threshold, recognizing the alarm state when said average value is smaller than said threshold, and then producing an alarm from said alarm generating means.

DESCRIPTION OF THE PREFERRED EMBODIMENT

Figure 2:
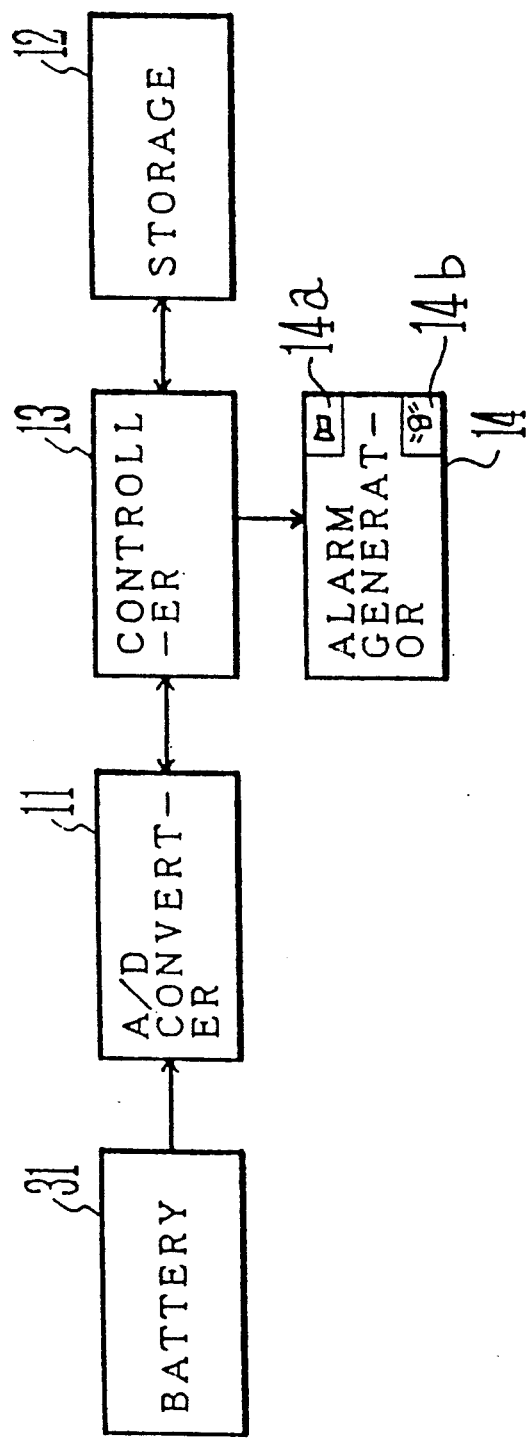
FIG. 2 shows a block diagram of the principle of the present invention.

FIG. 2 shows a block diagram for explaining the principle of the present invention.

In FIG. 2, a battery alarm system generates an alarm on recognizing the reduction in an output voltage of a battery 31, and comprises an analog/digital (A/D) converter 11, a storage 12, a controller 13, and an alarm generator 14.

The analog/digital converter 11 converts an analog value of an output voltage of the battery 31 to a digital value.

The storage 12 stores a threshold indicative of an output voltage of said battery which is determined to be low enough to produce an alarm (referred to as the alarm state).

The controller 13 obtains an average value of digitalized output voltage values after they have been inputted for a plurality of times at a predetermined interval, compares the average value with the threshold, recognizes the alarm state when the average value is smaller than the threshold, and then produces an alarm from the alarm generating means.

The alarm generator 14 comprises, for example, a buzzer 14a, a lamp 14b, etc. for generating an alarm (sound and indicator) according to the instruction of the controller 13.

An analog value of the output voltage of a battery 31 is converted to a digital value by the analog/digital converter 11. The digital value of the output voltage is read into the controller 13 for a plurality of times at a predetermined interval (within a short time), and then the average value is obtained. By converting an analog value to a digital value and obtaining an average value as described above, the influence of voltage fluctuation of a battery within a short time can be reduced, and a stable value of output voltage can be obtained by the controller 13. As the controller 13 determines the alarm state after comparing the stable value of the output voltage (average value) with the threshold stored in the storage 12, an alarm system can generate an alarm stably with little influence of output voltage fluctuations of the battery 31.

An embodiment of the present invention is explained below in association with drawings.

Figure 3:
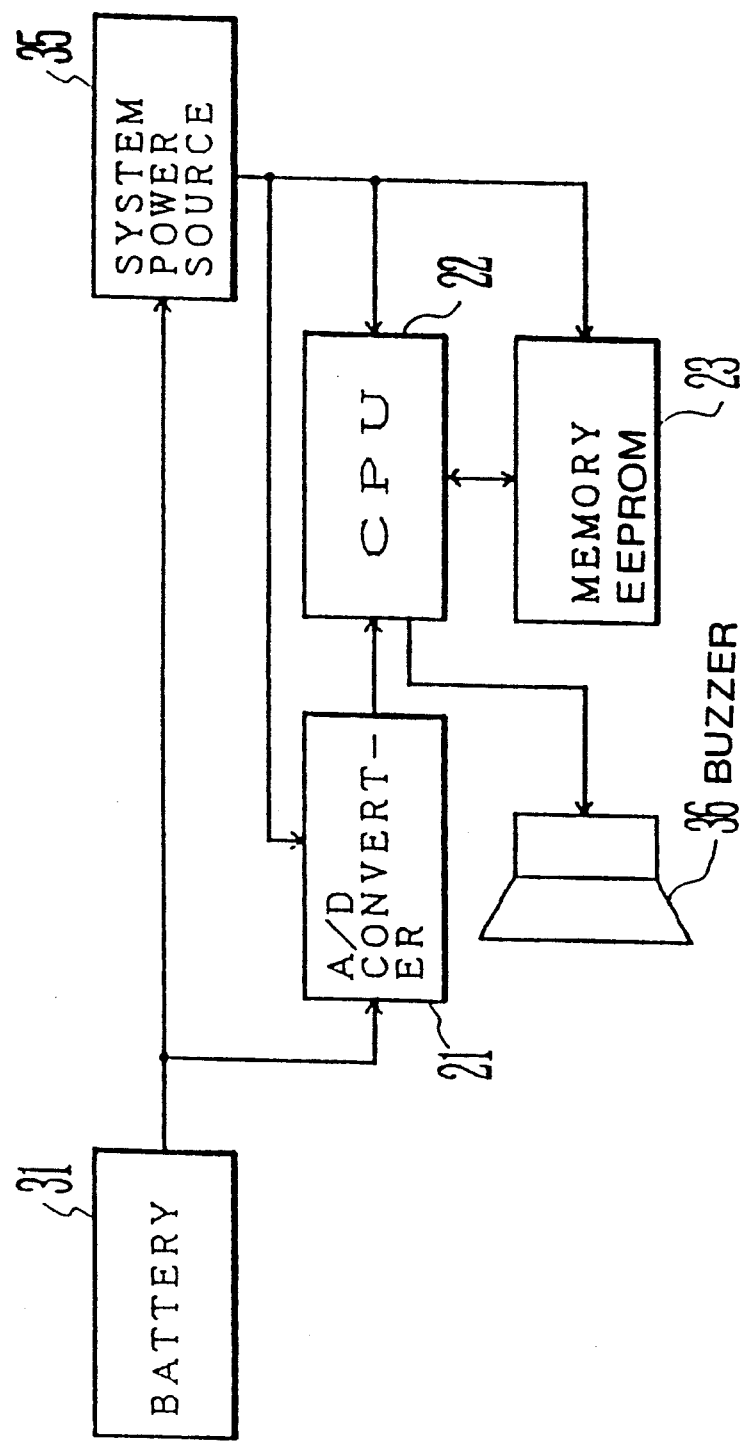
FIG. 3 shows a configuration of an embodiment.

FIG. 3 shows a configuration of an embodiment of the present invention.

Figure 1:
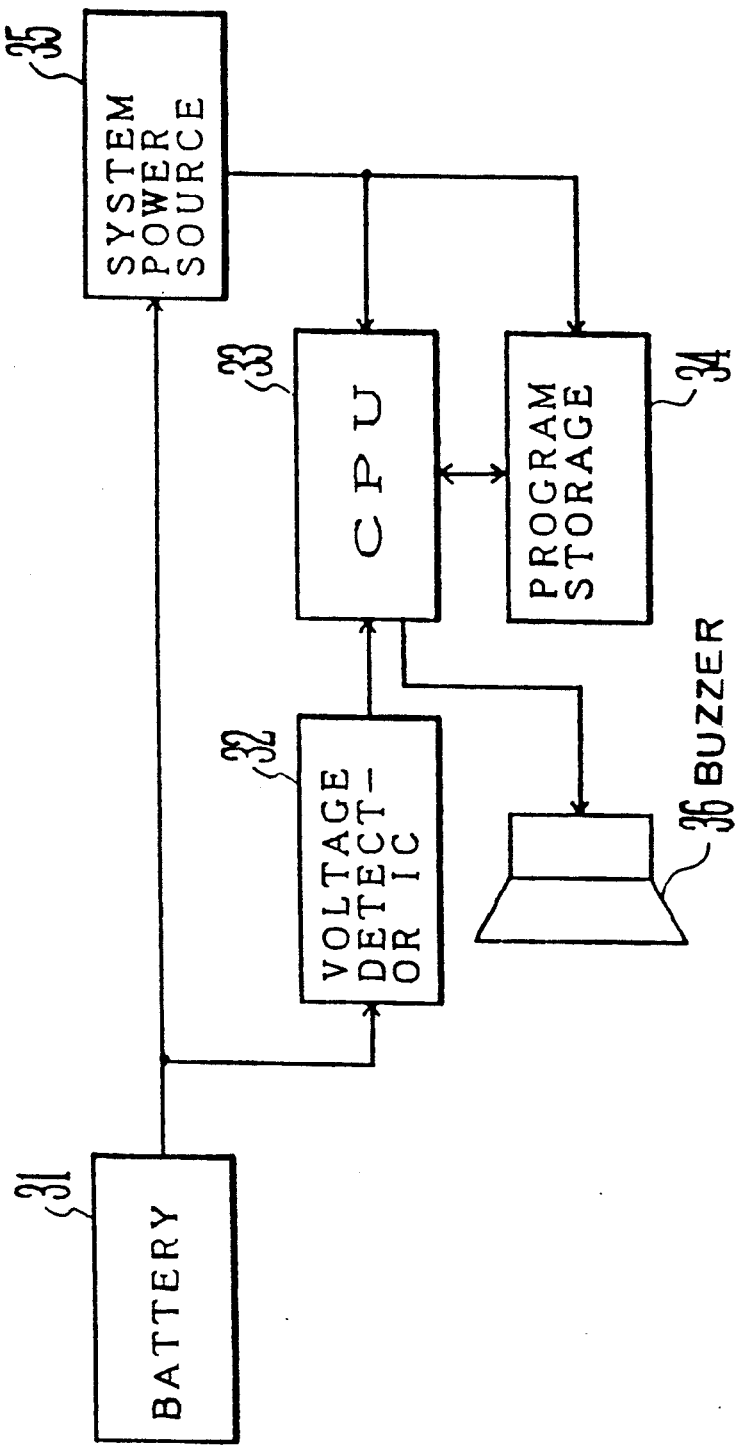
FIG. 1 shows a configuration of a conventional battery alarm system.

In FIG. 3, explanation is omitted (replaced with equal numbers) for the parts corresponding to those shown in FIG. 1.

An analog/digital converter (A/D converter) 21 is connected to the output terminal of a battery 31, and the output (a digital value) is applied to a CPU 22. The CPU 22 executes the following predetermined processes according to the program stored in a memory 23. The converting operation of the analog/digital converter 21 is performed under the control of the CPU 22.

Figure 4:
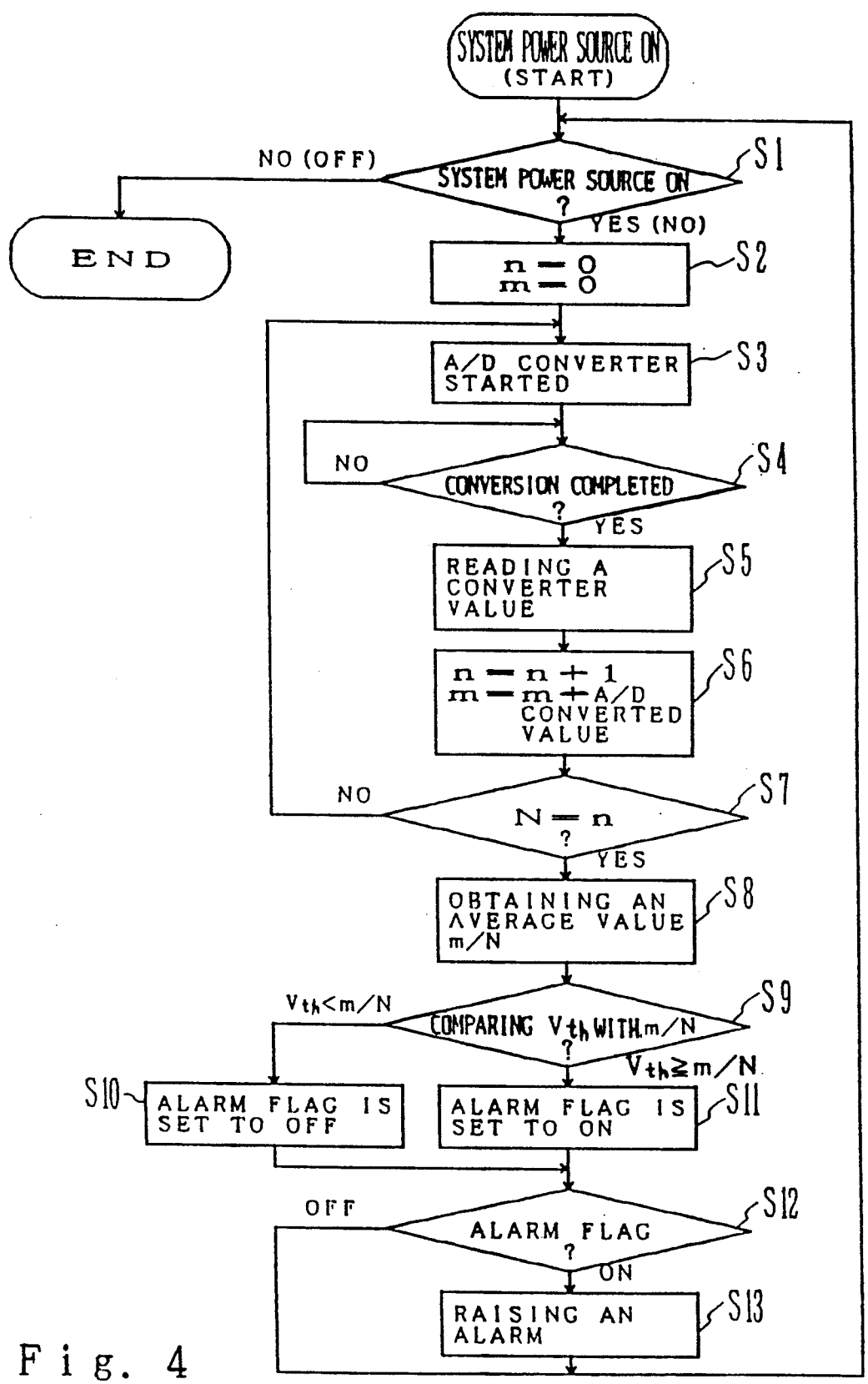
FIG. 4 shows a flowchart for explaining the operation of the above described embodiment.

Next, the process by a CPU 22, as a controller, is explained based on the flowchart shown in FIG. 4.

When a system power source 35 is turned on, the process starts with the confirmation of ON or OFF of the power source 35 (step S1). If OFF, the process is terminated. If ON, a variable n representing the occurrence number is set to 0, and a variable m representing the value of output voltage of the battery 31 is set to 0 (step S2). Then, the analog/digital converter 21 starts converting an analog value to a digital value (step S3), and the system waits for the completion of the conversion (step S4). After the conversion, a converted value (digital value) is stored (step S5); the value 1 is added to the variable n, and the converted value is added to the variable m (step S6). Next, it is determined whether or not the variable n is equal to the predetermined value N (occurrence number) (step S7); if no, control is returned to step S3 and the process is repeated until N equals n (steps S3–S7). In step S7, when N=n, the read value m is divided by the occurrence number N for obtaining the average value m/N because the value m indicates an addition of N converted values of the output voltage of the battery 31 (step S8).

Then, the threshold Vth stored in the memory 23 is compared with the average value m/N (step S9). If the average value m/N is larger than the threshold Vth, the condition of the battery is determined as being normal, and an alarm flag is set OFF (step S10). If the threshold Vth is larger than the average m/N, the state of the battery is determined as being the alarm state, and the alarm flag is set ON (step S11).

Next, the setting of the alarm flag is checked: if ON, a buzzer 36 sounds an alarm or a lamp starts blinking as an alarm indicator (step S13); if OFF, an alarm is not generated and control is returned to step S1. When control is returned to step S1, the processes S1–S13 are repeated until the system power supply 35 is turned off.

Although the occurrence number N can be set optionally, a correct determination can be made with N set to an optimum value. That is, the larger is the value of N, the more effectively the fluctuation of output voltage can be averaged, but the poorer the response to the abrupt voltage reduction will result.

If the memory 23 comprises an EEPROM for storing a program, the threshold Vth predetermined in the program can be modified and the alarm generating value of the output voltage is easily changed.

In calculating an average value of the output voltage (in digital value) of a battery, the above described output voltage value is inputted for a plurality of times at a predetermined interval. For example, when the input time is assumed to be t1, t2, t3, t4, ... (a value is inputted for a plurality of times at a predetermined interval as described above), an average value between t1–t4 is obtained first in the above described embodiment, and then an average value between t9–t11 is obtained, thus obtaining average values in a time divisional manner without overlapping time intervals. However, average values can be obtained in another way where an average value is obtained first between t1–t4, then between t2–t5, and next between t3–t6, thus obtaining average values by overlapping part of time intervals in which the average is obtained. This overlapping way is more useful to obtain the output voltage value of a battery.

Since the battery voltage fluctuates a little with the variation of environmental temperatures, a temperature sensor can be provided to adjust the above described threshold Vth according to the detected temperature. A threshold Vth can be adjusted easily in the present invention because it can be performed digitally.

The present invention provides a system for converting an analog value of an output voltage of a battery to a digital value, storing the digital value, obtaining an average value after reading the digital values for a plurality of times at a predetermined interval, and producing an alarm stably and constantly with little influence of voltage fluctuation.

Additionally, the present invention provides modifying a threshold by rewriting a program stored in the storage, so the alarm generating value of an output voltage can be appropriately modified if desired.

What is claimed is:

1. A battery alarm system for producing an alarm from an alarm generating means upon recognizing a reduction in an output voltage of a battery, the system comprising:
   an analog/digital converting means for converting analog values of the output voltage of said battery to digital values,
   a storing means for storing a threshold corresponding to an output voltage of said battery which is determined to be sufficiently low to generate an alarm and indicate an alarm state of the battery, and
   a control means connected to said converting means and receiving therefrom a plurality of output voltage values sequentially inputted at predetermined time intervals and calculating an average value of said plurality of voltage values by using one analog/digital conversion value which is overlapped for a number of said time intervals, said control means being connected to said storing means and to said alarm generating means for comparing said average value with said threshold, recognizing the alarm state of the battery when said average value is smaller than said threshold, and then producing an alarm from said alarm generating means.

2. A battery alarm system according to claim 1, wherein
   said storing means is an EEPROM.

3. A battery alarm system according to claim 1, wherein
   said alarm generating means includes an alarm with a buzzer.

4. A battery alarm system according to claim 1, wherein
   said alarm generating means comprises an indicator for notifying a user of an alarm.

* * * * *